United States Patent [19]
Wolfe

[11] 3,832,795
[45] Sept. 3, 1974

[54] FISHING FLOAT

[76] Inventor: Henry S. Wolfe, Beaver Hill Bldg. (So.), Jenkintown, Pa. 19046

[22] Filed: Mar. 13, 1973

[21] Appl. No.: 340,658

[52] U.S. Cl. .................. 43/17, 43/43.1, 43/44.9
[51] Int. Cl. ............................................ A01k 93/00
[58] Field of Search .......... 43/17, 43.1, 43.15, 44.9, 43/44.91, 17.5

[56] References Cited
UNITED STATES PATENTS
2,547,308   4/1951   Dean ..................................... 43/17
FOREIGN PATENTS OR APPLICATIONS
820,704   4/1937   France ................................... 43/17

*Primary Examiner*—Hugh R. Chamblee
*Attorney, Agent, or Firm*—Karl L. Spivak, Esq.

[57] ABSTRACT

A fishing float of the pivoting type which is pivotally connected to a sliding rod. The sliding rod is movable relative to the fishing line from a casting position which is located near the fishing hook to a floating position which is spaced from the hook a distance sufficient to permit the bait to slip to the exact desired depth. The float is generally elongated in configuration and includes a weight or a weighted arm at one end, a pivotal connection at the other end and a float portion which is interposed between the ends, the said float portion being positioned closer to the pivotal connection for leverage purposes to render the float extremely sensitive to fish strikes.

5 Claims, 6 Drawing Figures

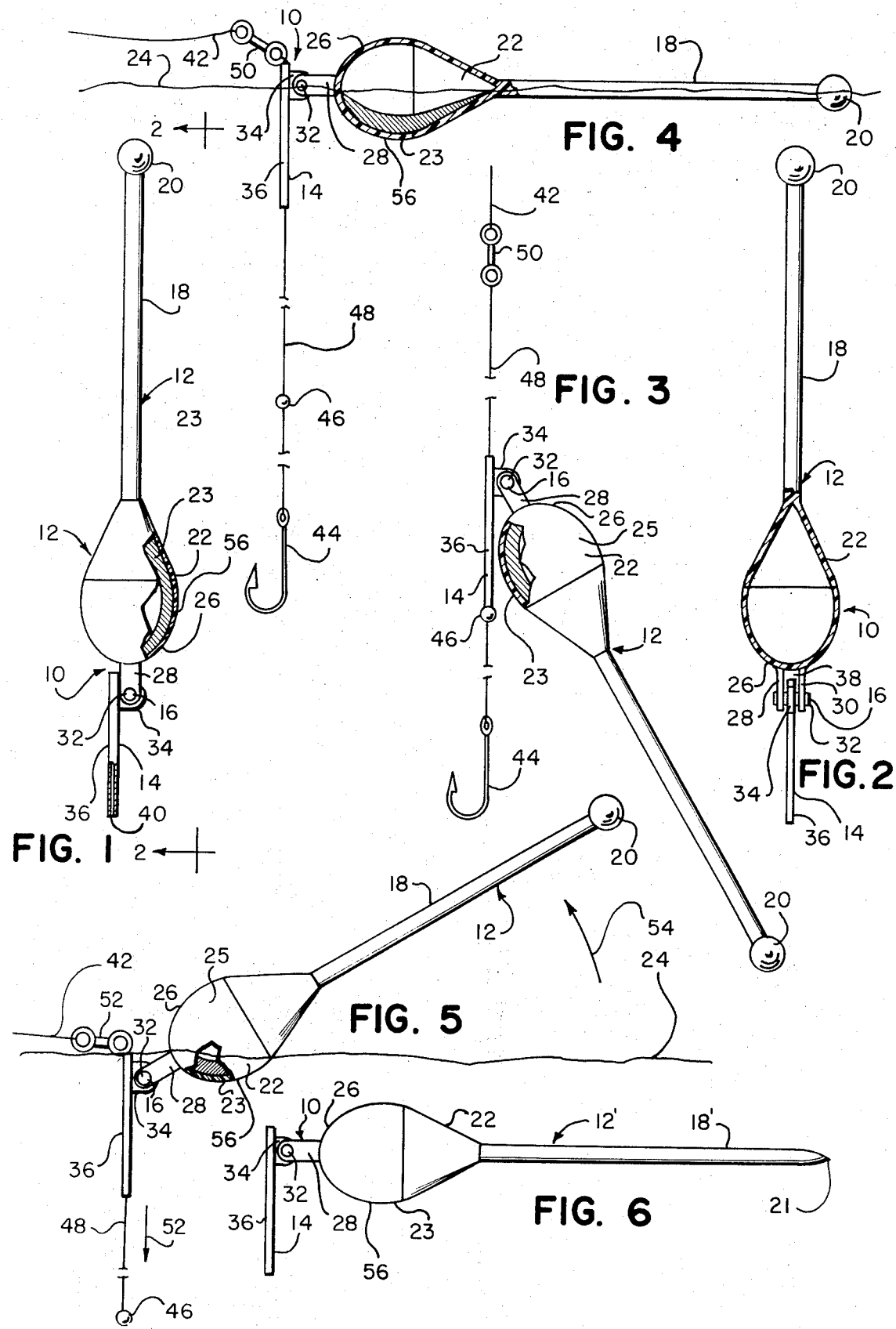

FISHING FLOAT

BACKGROUND OF THE INVENTION

The present invention relates generally to the art of fishing equipment, and more particularly, is directed to a fishing float of the pivotal type.

It has been the usual practice for fishermen to employ floats of various types in conjunction with fishing tackle. The floats as presently in use have been fabricated of buoyant material such as wood, cork and molded hollow plastics. Prior art floats have been developed with means to both tie directly into the fishing line in a fixed position or else spring clip means have been developed to enable the fishermen to readily removably affix the float to a line to any desired location.

Further, other workers in the field have developed fishing floats of both round configuration and of relatively elongated configuration. In the elongated type of prior art float, the buoyant member has generally been positioned equidistantly between the ends in a manner to position the float directly upon the surface of the water in a horizontal orientation. This type of elongated float has tended to be relatively insensitive to actions of a fish when attacking the bait and the prior art designs have proved to be sluggish in operation.

SUMMARY OF THE INVENTION

The present invention relates generally to fishing floats, and more particularly is directed to an elongate, pivoting type of float based on a fulcrum principle which is pivotally connected to a rod member which is held in sliding arrangement on a fishing line or leader.

The fishing float of the present invention includes a floating member comprising a buoyant member and a elongated body member which terminates outwardly in a weighted end which serves as a weighted end and signalling device. The floating member terminates inwardly in a pivotal connection. The buoyant member is interposed between the pivotal connection and the weighted end to float the device upon the surface of the water. The pivoting end is pivotally connected to a sliding rod which is arranged in sliding engagement upon a leader. The sliding rod is free to slide along the leader from a floating position wherein the hook is permitted to slip to the exact desired fishing depth, to a casting position wherein the float slides to a position near the hook. When in the casting position, all weight, including the hook, bait and float, is the closest point to the rod tip immediately prior to casting.

It is therefore an object of the present invention to provide an improved fishing float of the type set forth.

It is a further object of the present invention to provide a novel fishing float which incorporates an elongated body member which serves as a combination signal device and as a balancing weight, the fishing float terminating laterally in a weighted end and in a pivotal end and having a buoyant member interposed between the said ends.

It is another object of the present invention to provide a novel fishing float which includes in combination an elongated buoyant member which is pivotally connected at one end thereof to a sliding rod, the said sliding rod being in sliding engagement on a fishing line or leader.

It is a further object of the present invention to provide a novel fishing float of the pivoting type having means to render the float extremely sensitive to signal the actions of fish upon the bait by using the fulcrum principle to permit easy lifting of the signal member which otherwise would offer great resistance should it have to be lifted without the fulcrum method.

It is another object of the present invention to provide a novel fishing float including a hollow rod which is slidable relative to a fishing line and a floating member pivotally connected to the sliding rod, the said floating member being elongated in configuration and having a buoyant member integrally formed therein.

It is a further object of the present invention to provide a novel fishing float that has both longitudinal movement and pivotal movement relative to a fishing line.

It is another object of the present invention to provide a novel fishing float that is inexpensive in manufacture, simple in construction and trouble free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

BRIEF DESCRIPTION OF THE DRAWINGS

FIG. 1 is a side elevational view of a fishing float constructed in accordance with the present invention and partially broken away to expose details of internal construction.

FIG. 2 is a front elevational view thereof, taken along Line 2—2 of FIG. 1, looking in the direction of the arrows and partially broken away.

FIG. 3 is a side elevational view of the fishing float of FIG. 1 attached to a fishing line illustrated in casting position and partially broken away.

FIG. 4 is a side elevational view of the fishing float of FIG. 1 attached to a fishing line illustrated in floating position and partially broken away.

FIG. 5 is a side elevational view similar to FIG. 4 showing the fishing float in position to signal a strike and partially broken away.

FIG. 6 is a side elevational view similar to FIG. 4 showing a modified fishing float construction.

DESCRIPTION OF THE PREFERRED EMBODIMENTS OF THE INVENTION

Although specific terms are used in the following description for the sake of clarity, these terms are intended to refer only to the particular structure of my invention selected for illustration in the drawings, and are not intended to define or limit the scope of the invention.

Referring now to the drawings, I show in FIGS. 1 and 2 a fishing float generally designated 10 which comprises in combination an elongated floating member 12 and a sliding member 14 which pivotally interconnect in a pinned, pivotal connection 16. The sliding member 14 is generally of hollow cylindrical configuration and is provided with an axial bore 40 of size to receive the fishing leader 48 therein in sliding engagement.

The floating member 12 is fabricated with an elongated body member 18 which terminates at one end in a weighted head 20 and at the other end in a hollow buoyant member 22 which has sufficient buoyancy to maintain the entire device at the water surface 24 as in FIGS. 4 and 5. Preferably, the floating member 12 including its body member 18, weighted head 20 and the hollow buoyant member 22 is integrally formed of suitable plastic material in manner well known to those skilled in the art. Optionally, the buoyant member 22 could be fabricated of a buoyant material such as cork, foam or plastic of sufficient buoyancy to maintain the floating nature of the device, and a separate, connected elongated body member. The connected end 26 of the buoyant member 22 carries a pair of spaced, forwardly projecting ears 28, 30 which are drilled or otherwise treated to receive the ends of the pivot pin 32 to form the pivotal connection 16 with the sliding rod member 14.

In a preferred embodiment, the thickness of the buoyant member 22 should be heavier in one quadrant 23 of the float so that the floating member 12 will react more quickly when in use. By constructing the buoyant member heavy quadrant 23 of thicker material than the balance of the buoyant member wall 25, the additional weight will cause the float 12 to roll quickly to the correct position when in use in the water. The forces of gravity will act to turn the buoyant member 22 quickly so that the float will position with the heavy quadrant 23 facing downwardly and with the sliding member 14 vertical.

The heavy quadrant 23 may be fabricated of the same material as the buoyant member 22 itself, and preferably would be simultaneously molded therewith by simply designing thicker material deposit. Optionally, the material comprising the heavy quadrant 23 could be a weight of suitable characteristics which could be cemented or otherwise securely affixed to the buoyant member 22. The thickness of the heavy quadrant 23 should preferably be fabricated slightly heavier nearest the pivotal connection 16 to further increase the sensitivity of the device so that the float will react more quickly. In this manner, a fulcrum point 56 can be established as a balance point. Preferably, the geometry of the system will be such that weight of the device to the left of the fulcrum point 56 multiplied by the lever arm distance from the fulcrum point to the pivotal connection 16 will counterbalance the weight of the device to the right of the fulcrum point 56 multiplied by the lever arm distance from the fulcrum point to the weighted end 20 or plain end 21. (FIG. 6).

As best seen in FIGS. 1 and 2, the sliding member 14 is equipped with an integral pivotal arm 34 which projects at right angles to the longitudinal orientation of the sliding member body 36. The pivotal arm 34 is preferably of flat configuration of dimensions to readily fit within the space 38 which is defined between the ears 28, 30 which extend from the floating member 12. The pivotal arm 34 is provided with a hole to loosely overfit the pivot pin 32 to complete the remainder of the construction forming the pivotal connection 16. The pivotal arm 34 should be freely pivotal about the pivot pin 32 so as not to interfere with the sensitivity of the device in detecting the presence of a fish. The body 36 of the sliding member 14 is preferably fabricated of easily molded plastic material such as polyethylene plastic and is constructed to an elongate, hollow, rod-like configuration having a longitudinal axial bore 40 of sufficient size to loosely overfit a fishing leader 48 in sliding engagement without binding.

The weighted head 20 is fabricated of sufficient weight, which may be in the form of dense plastic or plastic imbedded lead, to maintain the fishing float 10 in horizontal orientation upon the water surface 24 as in FIG. 4. The weight in the head 20 acting through the lever arm of the floating member 12 should be sufficient to counterbalance the weight of the fishing hook 44, the bait affixed thereto (not shown) and the weight of a sinker 46 affixed to the fishing leader 48 to pivot the floating member 12 about the pivotal connection 16 and to float the device 10 upon the surface of the water. Additionally, by employing the fulcrum principle about the fulcrum point 56 as hereinbefore set forth, the fishing float can be designed to be extremely sensitive to the nibbling of a fish, even a fish as small as a pan fish.

As illustrated in FIG. 6, the weighted head 20 can be replaced with a plain end 21 by fabricating the elongate body member 18' of the modified floating member 12' of sufficient weight to properly counterbalance the device. Preferably, the added weight is uniformly distributed throughout the length of the modified body member 18'. The remaining portions of modified fishing float 10' are fabricated identically to the float 10 and are designated with the same numerals.

In order to use the device, a length of fishing line is selected as a leader 48 and a usual fishing hook 44 is affixed at one end thereof in well known manner. The sliding member 14 is then associated with the leader 48 by inserting the free end of the leader through the longitudinal bore 40 to allow the sliding member 14 and the pivotally connected floating member 12 to be freely slidable along the length of the leader. The end of the leader is then connected to the fishing line 42 in well known manner such as by employing a line connector which may be in the form of a wire eyelet 50. The connecting eyelet 50, in accordance with usual practice, should be small enough to readily fit through the usual fishing rod guides (not shown) to facilitate storing and casting procedures. The eyelet 50 should be larger than the longitudinal bore 40 so that the sliding member 14 will stop against the eyelet 50 when in use, as in FIGS. 4 and 5. The length of the leader 48 should be cut to the required size to permit the hook 44 to slip to the desired depth at which the fisherman thinks contains the greatest concentration of fish when considering that the fishing float 10 will maintain the top of the leader at or near the water surface due to its engagement with the eyelet 50.

After the leader 48 has been connected to the fishing line 42 by employing the eyelet 50 and with the fishing float 10 slidingly held on the leader, a sinker 46 is then affixed to the leader 48 in the vicinity of the fishing hook 44, for example approximately six inches away. The sinker 46 may be of the usual split shot type which can be readily crimped upon the leader 48 in any desired position. The split shot sinker 46 employed should be of sufficient weight to hold the bait at the desired depth and should be of greater diameter than the longitudinal bore 40 to prevent the sliding member 14 from sliding past the sinker 46. Thus, the sliding member 14 is free to slide along the length of the leader from the eyelet 50 to the sinker 46. When the device is in the water as in FIGS. 4 and 5, the sinker 46 urges the leader 48 downwardly relative to the sliding member 14 so that the fishing float 10 remains at the water surface 24 and the hook 44 is urged downwardly in the water the entire length of the leader 48, until the eyelet 50 is contacted by the sliding member 14.

When it is desired to cast the fishing line outwardly by employing well known casting techniques, the fishing line 42 is first reeled into the rod (not shown) as best indicated in FIG. 3. All the fishing line 42, the eyelet 50 and the portion of the leader 48 above the sliding member 14 and sinker 46 will be drawn past the fishing rod tip leaving all of the fishing float 10, the sinker 46 and the hook 44 consolidated near the fishing rod tip, thereby permitting the entire assembly to be cast as a unit. Once the fishing float 10 strikes the water surface 42, the fishing float will float upon the water surface and the sinker 46 will pull the leader 48 downwardly relative to the sliding member 14. The fishing float 10, 10' will position horizontally upon the water surface 24 as in FIGS. 4 and 6 due to the geometry of the device and the action of the weight 20 or weighted body member 18'. When a fish strikes the bait (not shown), it will tend to pull the hook 44 downwardly in a direction of the arrow 52 as in FIG. 5. The downward pull on the leader 48 will also tend to pull the eyelet 50 downwardly and under the surface 24 of the water. Due to the close orientation of the buoyant member 22 to the pivotal connection 16, a relatively large arc of swing in the direction of the arrow 54 will occur in relation to the downward pull on the hook, thereby lifting the weighted head 20 and a portion of the body member 18 or 18' clear of the water. Due to the geometry of the construction, a relatively small downward movement of the leader 48 caused by a fish nibbling in the vicinity of the hook 44 will cause a relatively large swing of the body member 18 or 18', thereby to readily alert the fisherman to the pending catch.

Although I have described the present invention with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a fishing float for maintaining the end of a fishing line including a hook and sinker, at a desired depth below the water surface, the combination of
A. a leader having a connected end and a hook end, 1. said connected end being connected to the end of the fishing line,
2. said connected end being equipped with a line connector,
3. said line connector having a dimension greater than the diameter of the leader,
4. a sinker affixed to the leader near the hook end, a. said sinker having a cross sectional dimension greater than the diameter of the leader;

B. a sliding rod of generally hollow cylindrical configuration and having an upper end and a lower end, 1. said sliding rod having a longitudinal axial bore,
2. the said sliding rod receiving the leader within the bore;
3. the sliding rod being movable relative to the leader from an upper floating position to a lower casting position,
4. the said bore being of size too small to permit passage of the line connector,
5. the said sliding rod contacting and stopping against the line connector when the sliding rod moves to the upper floating position,
6. the said bore being of size too small to permit passage of the sinker,
7. the said sliding rod contacting and stopping against the sinker when the sliding rod moves to the lower casting position,
8. the said sliding rod including a fixed pivotal arm near the upper end;

C. a floating member of elongate configuration connected to the sliding rod at the pivotal arm in a pivotal connection, 1. said floating member normally floating in a horizontal position at the water surface,
2. said floating member having pivotal movement relative to the sliding rod about the fixed pivotal arm to a position angularly above the horizontal upon action of a fish on the hook,
3. the floating member comprising an elongated body member and a buoyant member connected together, a pivotal end, and a weighted end, the pivotal end being connected to the sliding rod,
4. the buoyant member being fabricated to provide one weighted quadrant, the weighted quadrant serving to quickly orient the fishing float in the water with the sliding rod positioned vertically,
a. the weighted quadrant being positioned below the pivotal connection when the floating member is in the said horizontal position.

2. The invention of claim 1 wherein the buoyant member is oriented substantially closer to the pivotal end than to the weighted end.

3. The invention of claim 1 wherein the said hook connects to the hook end of the leader and the sinker affixes to the leader near the hook end and wherein the said sinker defines the lower limit of travel of the sliding rod relative to the leader when the sliding rod is moved to its lower, casting position.

4. The invention of claim 1 wherein the line connector defines the upper limit of travel of the sliding rod relative to the leader when the sliding rod is moved to its said upper floating position.

5. The invention of claim 1 wherein the weighted quadrant is fabricated heavier nearest the pivotal connection to increase the sensitivity of the device.

* * * * *